*J. J. Hines,*

*Cotton Press.*

No. 94,602. Patented Sep. 7, 1869.

Witnesses:
C. H. Petit
S. C. Henrow

Inventor:
J. J. Hines
by Munn & Co.
Attorneys

United States Patent Office.

J. J. HINES, OF EVERGREEN, ALABAMA.

Letters Patent No. 94,602, dated September 7, 1869.

IMPROVEMENT IN COTTON AND HAY-PRESSES.

The Schedule referred to in these Letters Patent and making part of the same.

*To all whom it may concern:*

Be it known that I, J. J. HINES, of Evergreen, in the county of Conecuh, and State of Alabama, have invented a new and improved Cotton and Hay Press; and I do hereby declare that the following is a full, clear, and exact description of the construction and operation of the same, reference being had to the accompanying drawings, making a part of this specification, in which—

Figure 2:
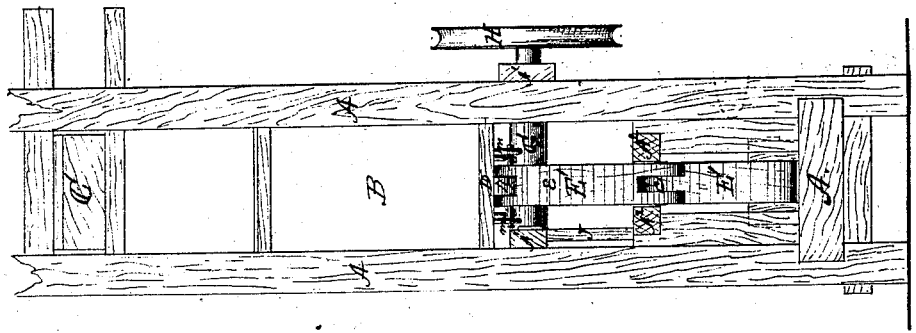
Figure 2 is an edge view.

This invention is an improvement upon those presses, in which toggle-joint levers are employed to raise and lower the platen; and It consists in a novel and simple application of such levers, in combination with the means for actuating them.

An obvious advantage of toggle-joint levers over all others, for raising and lowering the platen of a cotton or hay-press, is found in the fact that when the material is first put into the box it is loose and offers but slight resistance to the platen, while afterward, as it becomes more compressed, it offers very great resistance. The platen, therefore, might well be raised very rapidly at first by the application of but little power, but as it rises, meeting with continually-increased resistance, there must be continually-increased power and diminished velocity.

To this movement the toggle-joint levers are peculiarly adapted, and therefore a press operated by them will always have a decided advantage over all others, in that it gives velocity of movement where speed is required, and where power is needed it furnishes one of the most powerful appliances known to mechanics. I have, therefore, sought to improve this class of presses, by the application of a novel device, to increase its effective power, and by simplifying the arrangement and combination of its working-parts, so as to make it cheap, light, and convenient of operation.

To this end I have, with most advantageous results, employed the arrangement shown in the accompanying drawings, in which—

A represents the frame of the press;

B, the conductor or tube under the press-box;

C, the laterally-sliding head, against which the bale is compressed, the walls of the press-box being removed, as shown in the drawings;

D, the platen;

E E', the two levers forming the toggle-joint apparatus for raising and lowering the platen;

F F, cords, ropes, or chains, which force the levers together, and cause their upper ends to rise with the platen; and G, the shaft, turned by a wheel or crank, H, which winds up or unwinds the ropes F F, and thus raises or lowers the platen.

The shaft G is supported in a cross-beam, A¹, which comes at the central joint of the levers, when they are raised, so that the draught of the rope is directly inward, applying the power to the greatest advantage at the time when the most power is needed.

I J are guides, attached to the platen, and extending through slots or gains in a cross-beam, A², for the purpose of keeping the platen perfectly horizontal under all circumstances.

The whole arrangement, as thus described, is simple, convenient, and effective

The upper arms of the two levers E E' are made with an outward bend at $e$, and are provided with friction-rollers, $r$ $r$.

Figure 1:
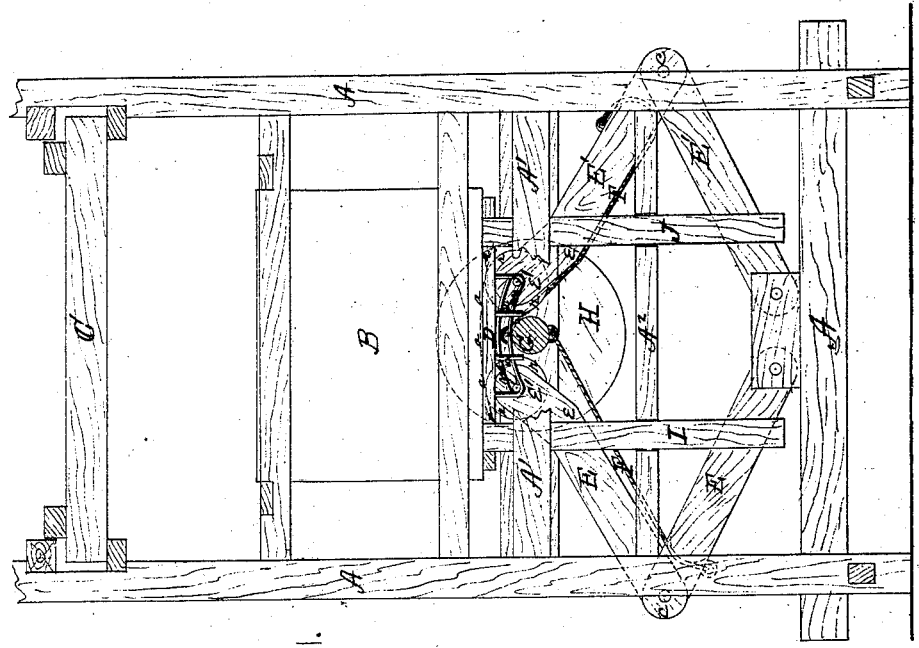
Figure 1 is a side view, a small portion being shown in section.

These rollers bear against a curved concave track or bed cut in the under side of the platen, and indicated by the dotted lines $a$ $a$ $a$ $a$, fig. 1, the deepest part of said cut being exactly at the centre of the platen, and from that point it grows shallower as it extends toward either end.

The trunnions, or journals $i$ $i$, of the friction-rollers, extend through the walls of the levers E E', as shown in fig. 2, and follow a curved track, formed by means of iron rods $m$ $m$, arranged as shown in fig. 1, the curve of said track corresponding to that of the track $a$ $a$ $a$, in the under side of the platen.

When the levers have nearly come together, in ordinary toggle-joint presses, they act with great power, but with even unnecessary slowness, so that the platen can hardly be said to move at all for some time before the levers cease to move.

The peculiar construction above described is designed to obviate this difficulty and to cause the levers to continue to raise the platen even to the end of their own movement.

As the levers begin to lift, their upper ends will come together, the trunnions running against the stops $n$ $n$.

The bent ends $e'$ $e'$, of the levers, will then continue to move till their faces become parallel with each other.

Up to this time the levers will have been acting with no greater force than heretofore, but the moment that the bent ends $e'$ $e'$ pass the parallel and begin to separate again, the rollers $r$ $r$ will be forced outward, and will act upon the double incline $a$ $a$ $a$ $a$ in such a manner as to raise the platen by their own horizontal motion in addition to raising it by their vertical motion, and this duplex movement and operation will continue until the toggle-levers shall have entirely ceased to move.

The additional impulse thus given to the platen is considerable, especially as compared with the space through which the platen moves toward the end of the movement of the levers.

Having thus described my invention,

What I claim as new, and desire to secure by Letters Patent, is—

1. In a toggle-joint lever-press, the employment of the levers bent at $e$, in connection with the friction-rollers $r\ r$, the concave track $a\ a\ a\ a$, and the curved track $m\ m$, for the journals $i\ i$, substantially as described, and for the purpose specified.

2. The arrangement of the shaft G so as to come opposite the joints $c\ c$, when the levers are drawn together, in connection with cords F F, bent arms $e'\ e'$, rollers $r\ r$, guide $m\ m$, stops $u\ u$, and concave track $a\ a\ a$, substantially as described, and for the purposes specified.

J. J. HINES.

Witnesses:
ALLEN M. GUNN,
PINCK. D. BOWLES.